United States Patent
Gurevitz et al.

(10) Patent No.: US 7,660,371 B2
(45) Date of Patent: Feb. 9, 2010

(54) NORMALIZED AUTO-CORRELATORS

(75) Inventors: Assaf Gurevitz, Tel Aviv (IL); Uri Perlmutter, Holon (IL)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 11/516,902

(22) Filed: Sep. 7, 2006

(65) Prior Publication Data

US 2008/0063094 A1 Mar. 13, 2008

(51) Int. Cl.
 *H04L 27/06* (2006.01)
(52) U.S. Cl. .................................................... 375/340
(58) Field of Classification Search .................. 375/340
 See application file for complete search history.

(56) References Cited

U.S. PATENT DOCUMENTS

| 5,903,596 | A  | * | 5/1999  | Nakano ..................... 375/150 |
| 6,496,798 | B1 | * | 12/2002 | Huang et al. ................ 704/230 |
| 6,611,800 | B1 | * | 8/2003  | Nishiguchi et al. .......... 704/221 |
| 7,480,234 | B1 | * | 1/2009  | Hart et al. .................... 370/208 |
| 2005/0259759 | A1 | * | 11/2005 | Suzuki ........................ 375/260 |

OTHER PUBLICATIONS

Hirose, "A scheme for pitch extraction of speech using autocorrelation function with frame length proportional to the time lag", 1992 IEEE International Conference on Acoustics, Speech, and Signal Processing, 1992, ICASSP-92, vol. 1, Mar. 23-26, 1992 pp. 149-152 vol. 1.*
Kim, Use of spectral autocorrelation in spectral envelope linear prediction for speech recognition, IEEE Transactions on Speech and Audio Processing, vol. 7, Issue 5, Sep. 1999 pp. 533-541.*
Monin, "Exact ARMA lattice predictors from autocorrelation functions", IEEE Transactions on [see also Acoustics, Speech, and Signal Processing, IEEE Transactions on] Signal Processing, vol. 42, Issue 4, Apr. 1994 pp. 877-886.*
Han, "Adapt the steady-state Kalman gain using the normalized autocorrelation of innovations", IEEE Signal Processing Letters, vol. 12, Issue 11, Nov. 2005 pp. 780-783.*

* cited by examiner

*Primary Examiner*—Juan A Torres
(74) *Attorney, Agent, or Firm*—Lee & Hayes, PLLC

(57) ABSTRACT

Embodiments of methods and systems for auto-correlating wireless signal samples are provided. Such embodiments include local normalization of each signal sample by a root mean square level of samples that preceded it, prior to any summation of the auto-correlation procedure. These auto-correlated signal samples are then used to distinguish downlink from uplink signals present within the signal sample set. Other embodiments include auto-correlation techniques in which no normalization is performed at any time with respect to the summation procedure. Such auto-correlated samples are then scanned to detect a preamble symbol or symbols within the signal samples. Reliable and expeditious wireless communications under WiMAX 802.16e and other protocols can be achieved in accordance with the present embodiments.

9 Claims, 6 Drawing Sheets

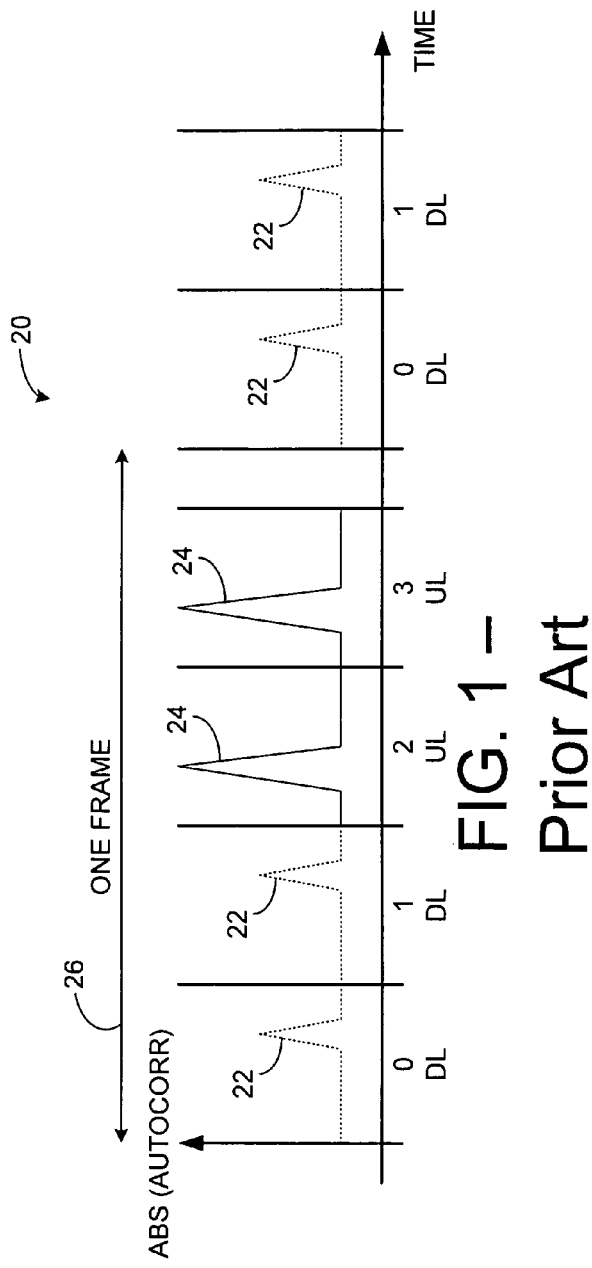
FIG. 1 – Prior Art
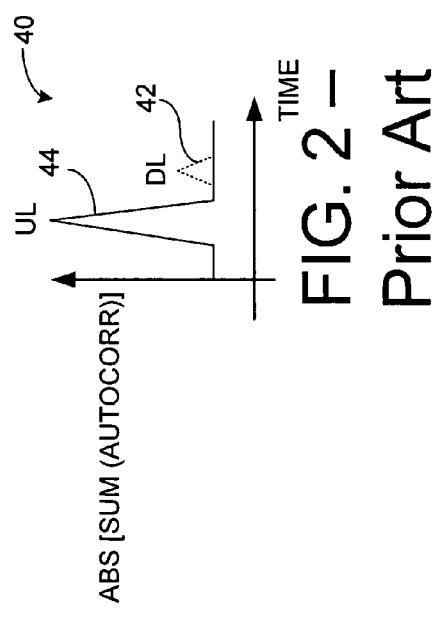
FIG. 2 – Prior Art

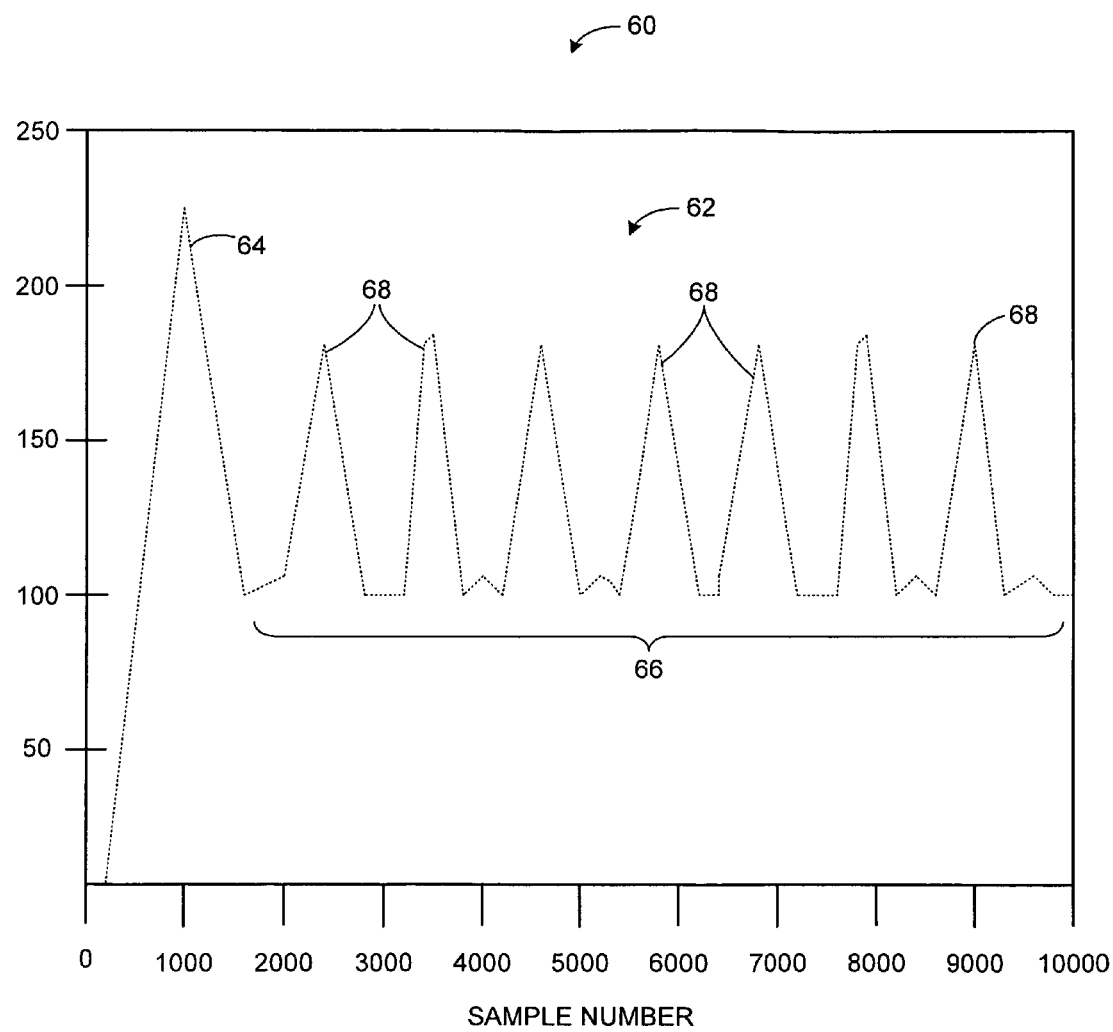
FIG. 3 – Prior Art

NORMALIZED AUTO-CORRELATORS

BACKGROUND

Classic auto-correlation techniques are applied in order to detect symbols and/or other meaningful information in a corresponding data stream. Auto-correlation is performed between a presently received wireless signal and a delayed (sampled) version of that signal stored in memory. Generally, such auto-correlation techniques typically either exploit the redundancy of the orthogonal frequency-division multiplexing access (OFDMA) signal the stems from the presence of a cyclic prefix guard interval, exploit the ⅓ (one-third) symbol periodicity of the preamble of such a signal. As one example, WiMAX 802.16e signals utilize the one-third symbol periodicity mentioned above.

However, two problems are known to exist under classical auto-correlation strategies. In the first case, it is sometimes difficult or impossible to distinguish a downlink signal (or symbol thereof) that is followed by time shifted uplink signal. This is due, at least in part, to the "global" normalization of energy that is applied in the classic technique. In the second case, the periodicity of a preamble symbol within an acquired signal can make it difficult, at best, to distinguish from other symbols or portions of symbols within the signal. Classical auto-correlation can exacerbate this problem by substantially boosting all symbols within the signal to similar magnitudes, such that distinguishing the preamble (and thus, establishing a symbol-recognition synchronization) is challenging or requires multiple attempts.

BRIEF DESCRIPTION OF THE DRAWINGS

FIG. 1 illustrates a signal diagram in accordance with one exemplary operating environment.

FIG. 2 illustrates a signal diagram in accordance with known techniques.

FIG. 3 illustrates another signal diagram in accordance with known techniques.

DETAILED DESCRIPTION

Underlying Concepts

Figure 4:
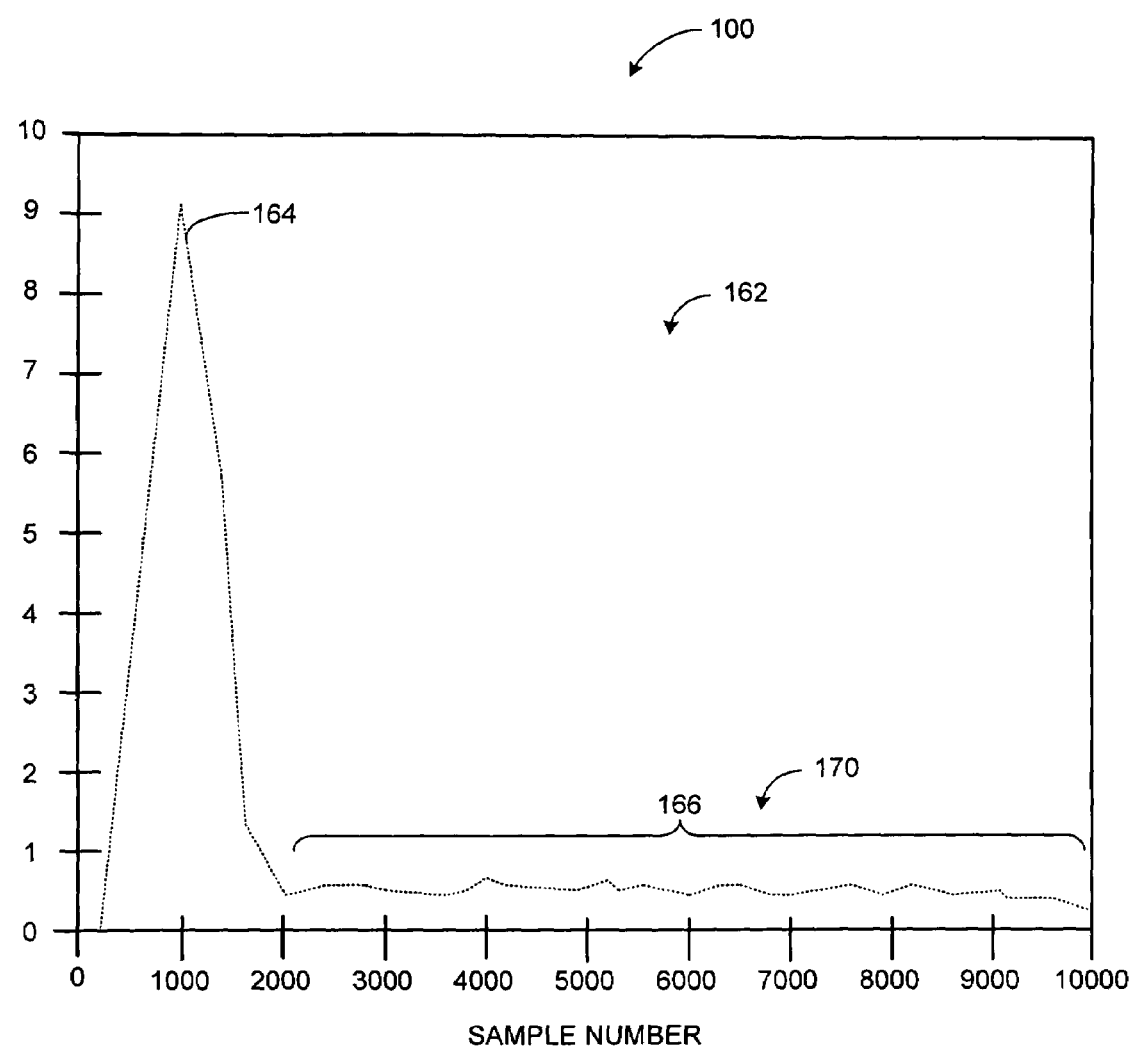
FIG. 4 illustrates a signal diagram in accordance with one embodiment.

Consider FIG. 1, which depicts an exemplary signal diagram 20. Both downlink signals (i.e., symbols) 22 and uplink signals (i.e., symbols) 24 are present within a single time frame 26. Such signals are representative, for example, of WiMAX signals. However, other orthogonal frequency-division multiplexing access (OFDMA) signals, IEEE 802.16-compliant signals, and/or other RF signals can generally be represented by the signal timing diagram 20. It is noted that the downlink signals 22 and the uplink signals 24 are repetitive in the sense that they represent ongoing (or perhaps time-to-time) bidirectional communication. Such communication comprises uplink signals 24 transmitted by a transceiver, transmitter or other apparatus (not shown), and downlink signals 22 being received (i.e., acquired) at the transceiver or a receiver. The uplink signals 24 are relatively strong due to the power and/or proximate nature of the transmitter with respect to the antenna receiving the relatively weaker downlink signals 22.

Under known techniques, the signals 22 and 24 of FIG. 1 are acquired (received) by appropriate receiving equipment (e.g., a WiMAX transceiver, etc.) and are sampled by way of analog-to-digital conversion means so as to derive a discrete data stream, or plurality of signal samples corresponding to the acquired signals 22 and/or 24. Thus, any symbol content or other intelligence within the acquired signals 22 and/or 24 is present within the plurality of signal samples.

Auto-correlation can be applied to the signal samples in an attempt to boost the value of its symbol content. One classical autocorrelation algorithm is represented as follows:

$$y[n] = \frac{\sum_{k=0}^{N-1}\sum_{j=0}^{CP-1} x[n-j-k\cdot(NFFT+CP)] \cdot x[n-j-k\cdot(NFFT+CP)-NFFT]^*}{\sum_{k=0}^{N-1}\sum_{j=0}^{CP-1} |x[n-j-k\cdot(NFFT+CP)]|^2} \quad \text{(Eq. 1)}$$

Wherein x[n] is the incoming sample, CP is the length of the cyclic prefix of the signal under scrutiny, N is the number of symbols of the signal, and NFFT is the FFT size (also being the distance between correlated samples). As used herein, NFFT is also defined as the Fast Fourier Transform length equal to the orthogonal frequency-division multiplexing access (OFDMA) symbol length minus the cyclic prefix length (CP). It is noted that the numerator of Equation 1 above expresses the auto-correlation operations, whereas the denominator is the energy normalization—referred to herein as a "global" normalization of the energy.

Still considering classical auto-correlation operation of Equation 1, the summation over index k accounts for an "overlap and add" operation. Results of the overlap and add operation—being symbols within the signal samples—are generally stored in a memory of (NFFT+CP) signal samples. A maximum absolute peak search is performed over this memory, in accordance with an established passing threshold value, in order to validate the presence of a signal.

Attention is now directed to FIG. 2, which depicts a diagram 40 of results that can occur under the classic auto-correlation of Equation 1. The diagram 40 shows an auto-correlated downlink signal 42 that is diminutive relative to an auto-correlated uplink signal 44. This sort of undesirable result can occur, for example, when classic auto-correlation (e.g., Eq. 1) is applied to a downlink signal (or symbol) that is followed by a time shifted, strong uplink signal. This outcome is attributable to the "global" normalization used in classic autocorrelation Equation 1, wherein the energy of the signal and the auto-correlation are calculated separately and divided only at the end of the frame (e.g., see the single frame 26 of FIG. 1). In any event, classic auto-correlation can have the significant drawback that the desired downlink signal (e.g., symbol 22 of FIG. 1) seems even weaker than its real power and hence "disappears" in the maximum search over the auto-correlated output peaks.

A somewhat opposite case is also true. Specifically, when the desired downlink signal (e.g., 22 of FIG. 1) is strong compared to an undesired uplink signal (e.g., 24 of FIG. 1), the global normalization tends to decrease the peak of the undesired uplink signal compared to the desired downlink one. However, from a point of view of the acquisition process, it would be desirable to distinguish all of the auto-correlated peaks (or symbols) within the signal samples during a particular frame, including those of the undesired signal (e.g., uplink, etc.).

Another general disadvantage of classical autocorrelation arises when such is applied for searching for the preamble symbol within a frame. A known auto-correlation algorithm applied to detecting preambles is represented below:

$$y[n] = \frac{\sum_{j=0}^{2/3NFFT+CP-1} x[n-j] \cdot x[n-j-NFFT/3]^*}{\sum_{j=0}^{2/3NFFT+CP-1} |x[n-j]|^2} \quad \text{(Eq. 2)}$$

Wherein x[n], CP, N and NFFT are as defined above.

In the case of Equation 2 above the distance between correlated samples is (NFFT/3) instead of NFFT, and no overlap and add operation is performed (i.e., there is no summation over k). Notice also that integration is performed over (⅔NFFT+CP−1) samples, which is different from equation 1 that uses integration over CP samples.

The auto-correlation process of Equation 2 exploits the one-third symbol periodicity of the preamble. However, in a WiMAX 802.16e frame, for example, there are data symbols that belong to zone types FUSC (i.e., Full Usage of Sub Channels), AMC (i.e., Adaptive Modulation and Coding), which are also one-third symbol periodic because their pilots are separated by a multiple-of-three number of sub-carriers. These factors may cause an auto-correlation outcome where the data symbols are confused as a preamble symbol.

Attention directed to FIG. 3, which depicts a signal diagram 60. The timing diagram 60 includes a plurality of (nearly ten-thousand) auto-correlated signal samples 62 plotted in time-order of acquisition (i.e., X-axis), against their respective magnitudes (i.e., Y-axis). The signal samples 62 are understood to have been auto-correlated in accordance with the classic auto-correlation algorithm of Equation 2 above. The signal samples 62 represent a preamble symbol 64 that is followed by an AMC zone 66 including seven symbols 68 with pilot separation equal to nine. It is noted that the periodicity is highest when the symbols 68 include only pilots (i.e., no allocated bursts or a small number of allocated bursts). In any event, the energy normalization inherent to classical autocorrelation is such that the preamble symbol 64 is not always readily discernable from the data symbols 68 that follow within the AMC zone 66.

The embodiments described below can address at least the foregoing problems, namely that of reliably distinguishing a weaker downlink signal from a stronger uplink signal that follows closely behind, and/or reliably detecting a preamble symbol within a plurality of acquired signal samples.

EXEMPLARY FIRST EMBODIMENT

In accordance with one embodiment, an exemplary new auto-correlation expression, is provided as follows:

$$y[n] = \sum_{k=0}^{N-1} \sum_{j=0}^{CP-1} \frac{x[n-j-k \cdot NFFT] \cdot x[n-j-(k+1) \cdot NFFT]^*}{\left(\sum_{l=0}^{NFFT-1} |x[n-j-l-k \cdot NFFT]|\right)^2} \quad \text{(Eq. 3)}$$

where: x[n] is an incoming sample, CP is a length of a cyclic prefix of the signal, N is a number of symbols within the signal samples, and NFFT is a distance between correlated samples.

At least the following differences are noted between new Equation 3 and the classic Equation 1. First, in Equation 3, the energy summation uses NFFT instead of CP samples. Second, the summation is performed for each index j and not n as in Equation 1—that is, summation of energy is inside the summation over the index j. This means that the samples x[n−j−k NFFT] and x[n−j−(k+1) NFFT] can be divided by the energy factor prior to their multiplication.

The new auto-correlation expression of Equation 3 can also be expressed in expanded form as follows:

$$y[n] = \sum_{k=0}^{N-1} \sum_{j=0}^{CP-1} \frac{x[n-j-k \cdot NFFT]}{\sum_{l=0}^{NFFT-1} |x[n-j-l-k \cdot NFFT]|} \cdot \quad \text{(Eq. 4)}$$

$$\frac{x[n-j-(k+1) \cdot NFFT]^*}{\sum_{l=0}^{NFFT-1} |x[n-j-l-k \cdot NFFT]|}$$

where: x[n], CP, N, and NFFT are as defined above in regard to Equation 3. Notice that in Equations 3 and 4, each sample is normalized by the root mean square (RMS) level of the last NFFT samples that preceded it. This significantly simplifies the complexity of the division circuit because the word lengths of its inputs are now much smaller.

Using Equations 3 and/or 4 instead, of classical Equation 1, solves the problem described in conjunction with FIGS. 1 and 2 in regard to distinguishing a desired downlink signal from a stronger uplink signal. This stems from the "local" normalization of the signal samples prior to their multiplication in the numerator of Equation 1, which entirely separates the auto-correlation normalization of the downlink signal from that of the uplink signal.

The auto-correlation procedure of Equation 3 (i.e., Equation 4) can be suitably implemented by way of, for example, a dedicated purpose integrated circuit or circuits, one or more processors executing corresponding program code, a state machine, an electronic circuit or device incorporating any one or more of the foregoing means, etc. Other apparatus can also be used to implement the auto-correlation stratagem of Equation 3 (and 4). An exemplary embodiment of such means will be discussed in further detail below.

EXEMPLARY SECOND EMBODIMENT

Consideration is now directed to the problem of reliably detecting a preamble symbol. In accordance with one embodiment, disabling the division aspect of the auto-correlation procedure of classic Equation 2 above results in markedly decreasing the peak values of the data symbols (e.g., 68 of FIG. 3) relative to the preamble symbol (e.g., 64 of FIG. 3). This results because the preamble is boosted, and empty symbols that include only pilots (and may be confused as a preamble) have a lower root mean squared (RMS) level than that of the preamble.

The following new auto-correlation expression reflects a solution to the preamble detection problem in accordance with one embodiment:

$$y[n] = \sum_{j=0}^{2/3 NFFT + CP - 1} x[n-j] \cdot x[n-j-NFFT/3]^* \quad \text{(Eq. 5)}$$

where: x[n], CP, and NFFT are as defined above in regard to Equations 3 and 4. It is noted that the absence of a denominator within the summation of Equation 5 is equivalent to division by one (i.e., unity).

FIG. 4 depicts an exemplary signal diagram 100 in accordance with the preamble detection solution proposed by way of Equation 5 above. The timing diagram 100 includes a plurality of auto-correlated signal samples 162 plotted in time-order of acquisition against their respective magnitudes. The signal samples 162 are understood to have been auto-correlated in accordance with the new auto-correlation Equation 5 above. The signal samples 162 represent a preamble symbol 164 that is followed by an AMC zone 166. Within the AMC zone 166 are a plurality of substantially attenuated signal samples 170. The preamble symbol 164 is immediately recognized by inspection of FIG. 4, while any subsequent data symbols present within the AMC zone 166 are not readily detectable. Clearly, any confusion of these next data symbols with the preamble 164 no longer exists. In one embodiment, the preamble symbol is boosted at least 15 dB greater than any subsequent data symbols within the sampled signal by way of the auto-correlation procedure of Equation 5.

The auto-correlation procedure of Equation 5 can be suitably implemented by way of, for example, a dedicated purpose integrated circuit or circuits, one or more processors executing corresponding program code, a state machine, an electronic circuit or device incorporating any one or more of the foregoing means, etc. Other apparatus can also be used to implement the auto-correlation stratagem of Equation 5. Thus, the reliable detection of a preamble symbol within a stream of signal samples is provided.

EXEMPLARY THIRD EMBODIMENT

Figure 5:
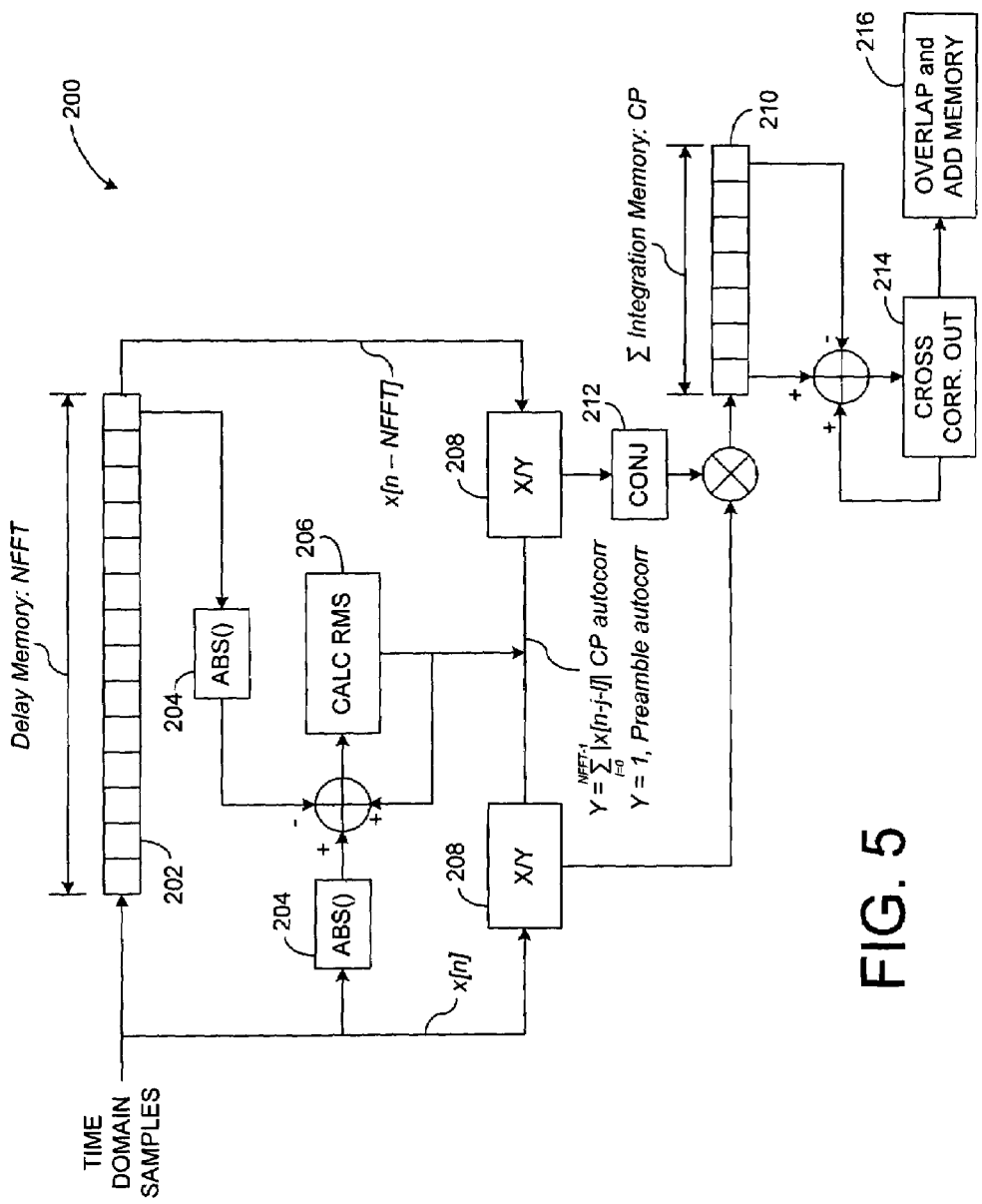
FIG. 5 illustrates a functional block diagram according to another embodiment.

FIG. 5 depicts a system 200 in accordance with one embodiment. It is to be understood that the system 200 is exemplary of any number of functional schemas for practicing the above-described embodiments. System 200 can be implemented, by way of example and not limitation, by various electronic circuitry, an integrated circuit or circuits, a processor or processor executing corresponding program code, etc. These and/or other suitable means can be employed to implement the functionality of system 200.

In this example, system 200 includes Delay Memory 202 configured to receive and store time-domain signal samples, and to move those samples through in an incremental, bucket-brigade fashion. System 200 also includes absolute value blocks 204 respectively configured to derive the absolute value of signal samples. System 200 further includes a CALC RMS block 206 configured to perform root mean square level estimation of NFFT samples and is used as the denominator when performing the division function. During detection of a preamble symbol, the CALC RMS block 206 has an output value set to one (unity), such that no energy normalization is performed. Also, the memory length during such preamble symbol detection is (NFFT/3), and not NFFT as in CP auto-correlation (i.e., distinguishing downlink from uplink signals). The integration length for Preamble detection is (2/3NFFT+CP). Such an operation is consistent with the description above in regard to new Equation 5.

Still referring to FIG. 5, system 200 includes X/Y blocks 208, which are configured to perform the normalization of the signal samples prior to their multiplication and summation in an integrated memory unit 210. The CONJ block 212 of system 200 is configured to derive the complex conjugate of data that is input thereto.

The system 200 further includes a CROSS CORR. OUT block 214 and an OVERLAP and ADD MEMORY block 216. These respective blocks 214 and 216 are employed while distinguishing downlink from uplink signals, etc., in accordance with the particular operation being performed at the time.

Exemplary System

Figure 6:
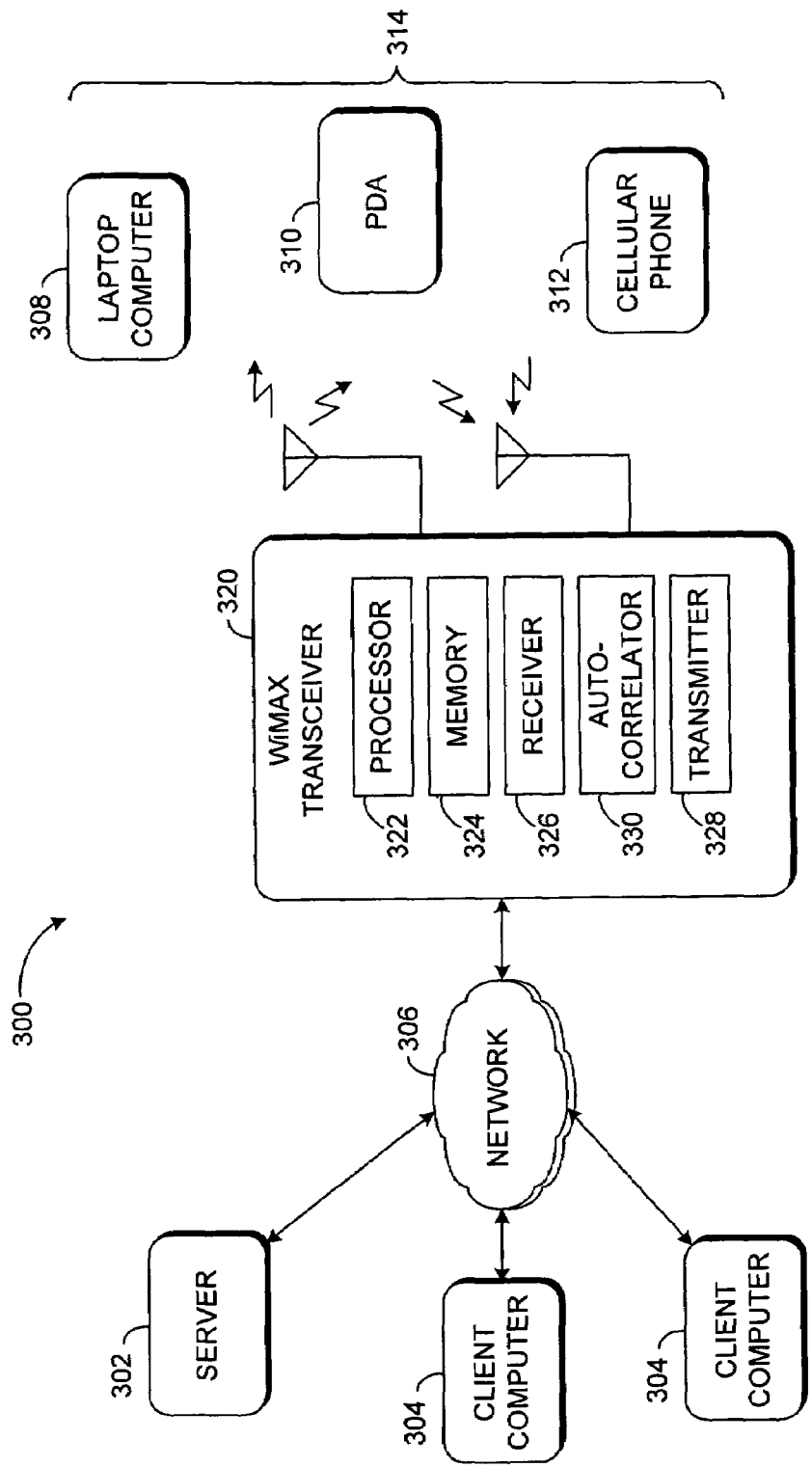
FIG. 6 illustrates an exemplary system according to yet another embodiment.

FIG. 6 depicts an exemplary system 300 according to another embodiment. System 300 is intended to exemplify but one of any number of possible systems inclusive of means and/or methods provided herein. Thus, the example system 300 is understood to be illustrative and non-limiting in its overall teachings.

The system 300 includes a server 302 and a plurality of client computers 304. The server 302 and client computers 304 are respectively defined and operative in any suitable known way. Thus, the server 302 and clients 304 are understood to be broadly applicable to any number of respective tasks. The system 300 also includes a network 306. The server 302 and the client computers 304 are coupled to, and are in communication with each other by way of, the network 306. The network 306 can be defined by any suitable known network topology including, but not limited to, a local-area network (LAN), a wide-area network (WAN), etc. Furthermore the network 306 can be defined by or in communication with the Internet.

The system 300 further includes a laptop computer 308, a personal digital assistant (PDA) 310 and a cellular phone 312. Each of the elements 308, 310 and 312 is respectively defined and configured in accordance with known topologies. For purpose herein, the laptop 308, PDA 310 and cellular phone 312 are understood to include bidirectional wireless communication functionality in accordance with WiMAX 802.16e protocols. Thus, the laptop computer 308, personal digital assistant 310 and cellular phone 312 are collectively referred to as wireless devices 314.

As also depicted in FIG. 6, the system 300 includes a WiMAX transceiver 320, coupled in communication with the network 306. The transceiver 320 includes a processor 322, a memory 324, a receiver 326 and a transmitter 328. Various respective functions of the receiver 326 and the transmitter 328 are under the control of the processor 322. In turn, the processor 322 executes one or more program codes (not explicitly shown) stored either internally and/or within the memory 324. Thus, the elements 322-328 of the transceiver 320 are electrically coupled so as to function as a cooperative entity.

The transceiver 320 further includes auto-correlator 330 functionality. The auto-correlator 330 is implemented and configured consistent with the balance of the transceiver 320 functions so as to provide auto-correlation performance consistent with any or all of Equations 3, 4 and/or 5 as described above. In one embodiment, the auto-correlator 330 is provided as a program code (storable within memory 324, etc.) executable by the processor 322. In another embodiment, the auto-correlator 3301 is implemented as a dedicated-function electronic circuit within the transceiver 320. In yet another embodiment, the auto-correlator 330 is provided as a program code on computer readable media such as, for example, floppy disk, CD-ROM, swappable/installable firmware, etc., and is downloaded to/installed within the transceiver 320. Auto-correlator 330 can be implemented within the transceiver 320 by way of these and any number of other suitable means, and exhaust elaboration is not required for purposes herein.

The system 300 of FIG. 6 typically operates as follows. Any of the server 302, client computers 304 and/or wireless devices 314 can communicate and cooperate by way of WiMAX 802.16e format RF signaling. As one non-limiting example, the transceiver 320 utilizes the auto-correlator 330 so as to readily distinguish uplink from downlink signals during an Internet surfing session by the laptop computer 308 via the network 306. In another non-limiting example, the auto-correlator 330 enables the transceiver to detect preamble symbols within wireless signals transmitted by the personal digital assistant 310. These and countless other operational scenarios can be performed by the system 300, wherein the auto-correlator 330 of the transceiver 320 serves to expedite and improve the reliability of WiMAX wireless communications.

Exemplary Methods

Figure 7:
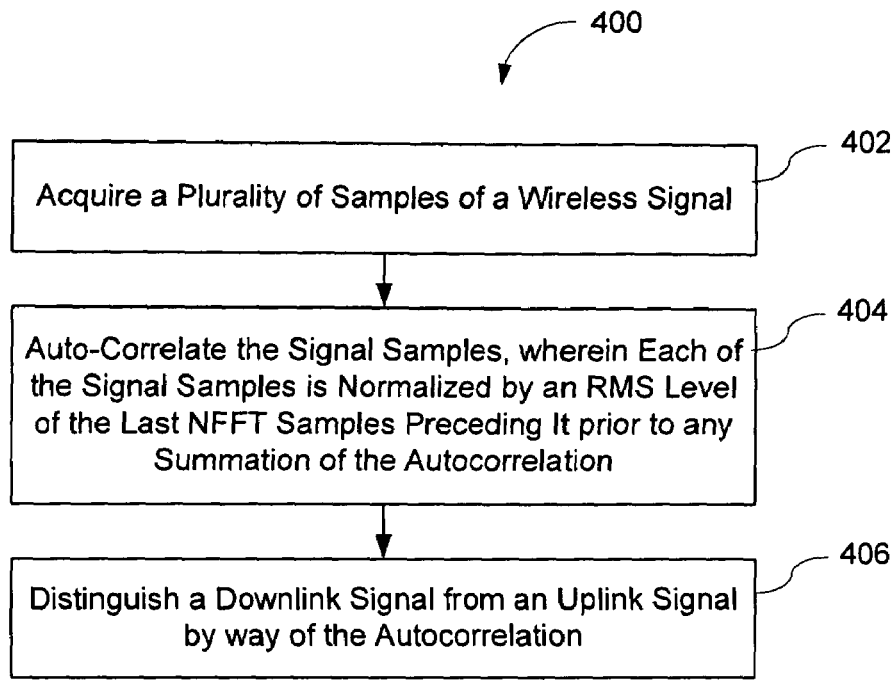
FIG. 7 illustrates a process flow diagram in accordance with one embodiment.

FIG. 7 is a flowchart 400 that describes a method in accordance with one embodiment. While the flowchart 400 describes particular methodical acts and order of execution, it is to be understood that the method of flowchart 400 is contemplated to be suitably varied, broadly applicable, and is not limited as specifically presented.

At 402, a plurality of wireless signal samples is acquired. Such signal samples can be acquired, for example, by way of a WiMAX transceiver such as transceiver 320 of FIG. 6. Other receiver and/or transceiver means can also be used.

At 404, the plurality of signal samples from 402 above is auto-correlated in accordance with Equation 3 (or 4) as described above. As such, each signal sample is locally normalized by a root mean square level value (or estimate) of the NFFT samples the preceded it, prior to any summation performed by the auto-correlation.

At 406, the auto-correlated signal samples are analyzed so that a symbol or symbols within a sought after downlink signal is distinguished from any uplink signal content. This distinction is then used, typically, to facilitate bidirectional communication between two or more wireless entities (e.g., a laptop computer and a cellular phone, etc.)

Figure 8:
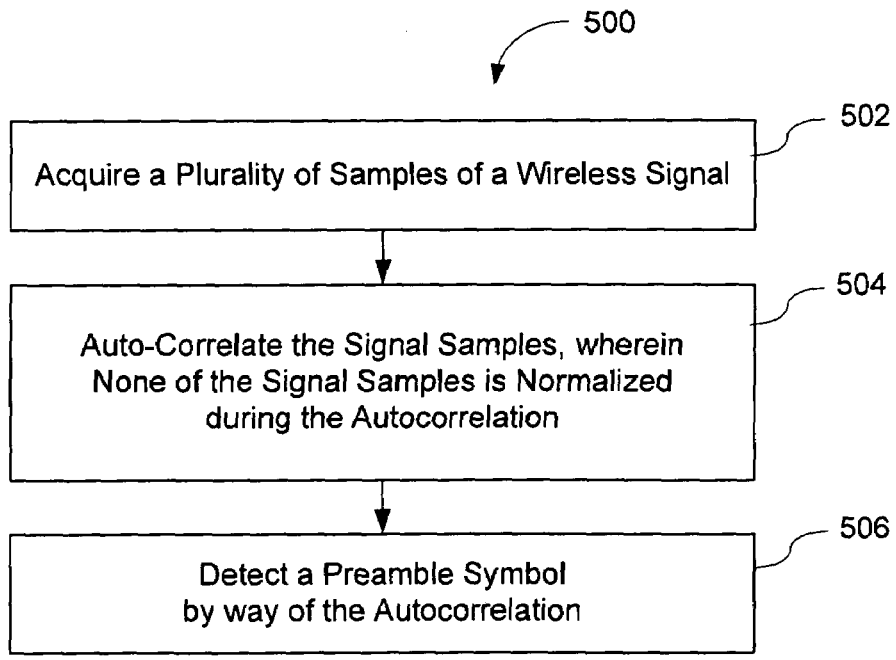
FIG. 8 illustrates a process flow diagram in accordance with another embodiment.

FIG. 8 depicts a flowchart 500 that describes a method in accordance with another embodiment. While the flowchart 500 describes particular methodical acts and order of execution, it is to be understood that the method of flowchart 500 is contemplated to be suitably varied, broadly applicable, and is not limited as specifically presented.

At 502, a plurality of wireless signal samples is acquired. Such signal samples can be acquired, for example, by way of WiMAX transceiver 320, etc. Other receiver and/or transceiver means can also be used.

At 504, the plurality of signal samples from 502 above is auto-correlated in accordance with Equation 5 as described above. Therein, each signal sample is not subjected to any normalization during the auto-correlation summation procedure.

At 506, the auto-correlated signal samples are analyzed (i.e., scanned) such that a preamble symbol or symbols is/are detected within the signal sample stream. This detection is then used, typically, to facilitate bidirectional communication between two or more entities (e.g., personal digital assistant and an Internet connection, etc.)

CONCLUSION

Embodiments and methods presented herein can provide solutions to problems encountered during known auto-correlation of wireless signals samples, such as those acquired from orthogonal frequency-division multiplexing access (OFDMA) signals, WiMAX IEEE 802.16e-compliant signals, etc. Generally, weaker downlink signals can be distinguished from relatively stronger uplink signals by way of the improved auto-correlation techniques. Similarly, the improved auto-correlation techniques can be used to detect preamble symbols with respect other data symbols present within an acquired signal sample set.

As a result, significantly enhanced performance can be realized in cases where auto-correlation is used for acquisition of a WiMAX (or other) downlink (i.e., down link) signal. Additionally, the present embodiments can measurably simplify hardware implementation costs. The improved performance can lower the probability of a false alarm when a WiMAX 802.16e downlink signal is followed by an uplink signal and, acquisition is performed by autocorrelation that exploits the cyclic prefix redundancy. Similar performance improvements are had when detecting a preamble symbol by exploiting the one-third symbol periodicity of the preamble.

Although the embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. A method, comprising:
storing, in a memory, instructions for performing the method;
executing the instructions on a processor;
according to the instructions being executed:
auto-correlating a plurality of signal samples from a signal by:
normalizing each of the plurality of signal samples by a root mean square level of a distance between correlated samples that preceded individual signal samples; and
summing the plurality of normalized signal samples;
wherein the auto-correlating is performed in accordance with the expression:

$$y[n] = \sum_{k=0}^{N-1} \sum_{j=0}^{CP-1} \frac{x[n-j-k \cdot NFFT] \cdot x[n-j-(k+1) \cdot NFFT]^*}{\left( \sum_{l=0}^{NFFT-1} |x[n-j-l-k \cdot NFFT]| \right)^2}$$

where: x is an incoming sample, CP is a length of a cyclic prefix of the signal, N is a number of symbols within the signal samples, and NFFT is a distance between correlated samples.

2. The method of claim 1, wherein:
the signal includes a cyclic prefix length; and
the method further comprises not including the cyclic prefix length as a term in the summation.

3. The method of claim 1, wherein the signal is defined by an orthogonal frequency-division multiplexing access (OFDMA) signal.

4. The method of claim 1, wherein the signal is defined by a WiMAX 802.16e down link signal.

5. The method of claim 1, further comprising distinguishing a downlink signal from an uplink signal by way of the auto-correlating.

6. A computer-readable storage media encoded with a program code, the program code configured to cause one or more processors to auto-correlate a plurality of signal samples from a signal by:
- normalizing each of the plurality of signal samples by a root mean square level of a distance between correlated samples that preceded individual signal samples; and
- summing the plurality of normalized signal samples;
- wherein the program code is further configured to cause the one or more processors to auto-correlate the plurality of signal samples in accordance with the expression:

$$y[n] = \sum_{k=0}^{N-1} \sum_{j=0}^{CP-1} \frac{x[n-j-k \cdot NFFT] \cdot x[n-j-(k+1) \cdot NFFT]^*}{\left( \sum_{l=0}^{NFFT-1} |x[n-j-l-k \cdot NFFT]| \right)^2}$$

where: x is an incoming sample, CP is a length of a cyclic prefix of the signal, N is a number of symbols within the signal samples, and NFFT is a distance between correlated samples.

7. The computer-readable storage media of claim 6, wherein the program code is further configured to process signal samples comprising orthogonal frequency-division multiplexing access (OFDMA) signals.

8. The computer-readable storage media of claim 6, wherein the program code is further configured to process signal samples comprising a WiMAX 802.16e down link signal.

9. The computer-readable storage media of claim 6, wherein the program code is further configured to cause the one or more processors to distinguish a downlink signal from an uplink signal by way of the auto-correlation.

* * * * *

UNITED STATES PATENT AND TRADEMARK OFFICE
CERTIFICATE OF CORRECTION

PATENT NO. : 7,660,371 B2
APPLICATION NO. : 11/516902
DATED : February 9, 2010
INVENTOR(S) : Gurevitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Twenty-eighth Day of December, 2010

David J. Kappos
*Director of the United States Patent and Trademark Office*